April 16, 1946.   M. E. ALEXANDER   2,398,399
PIPE JOINT
Filed Feb. 3, 1943   2 Sheets-Sheet 2
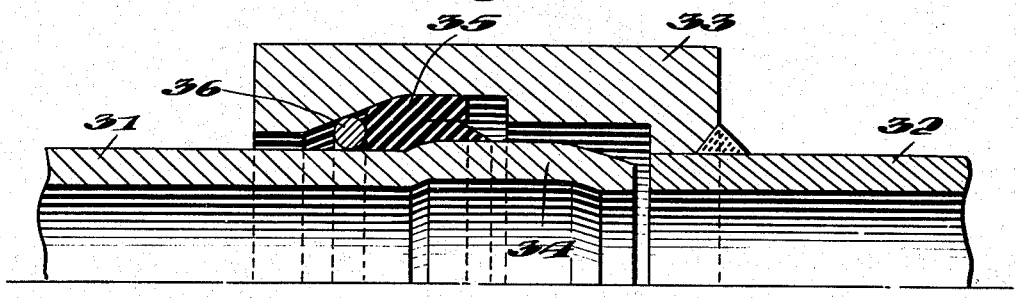
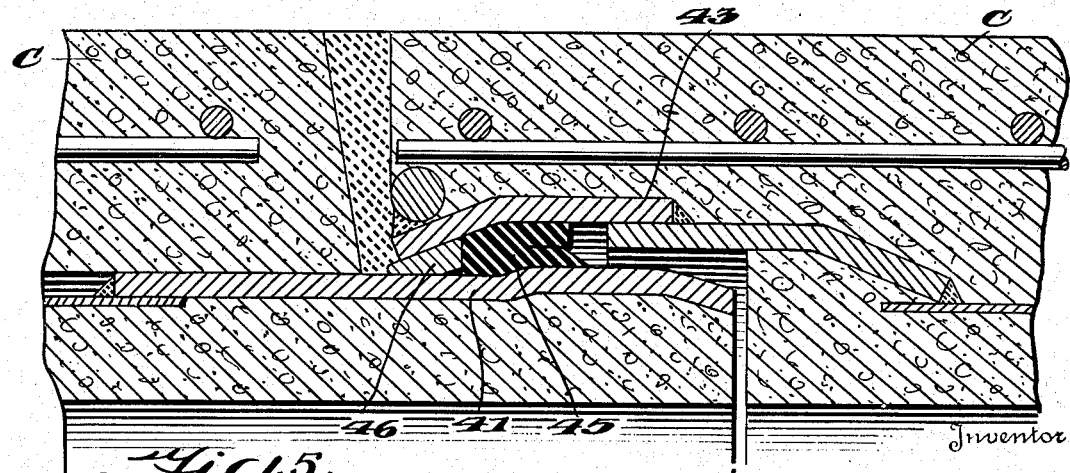

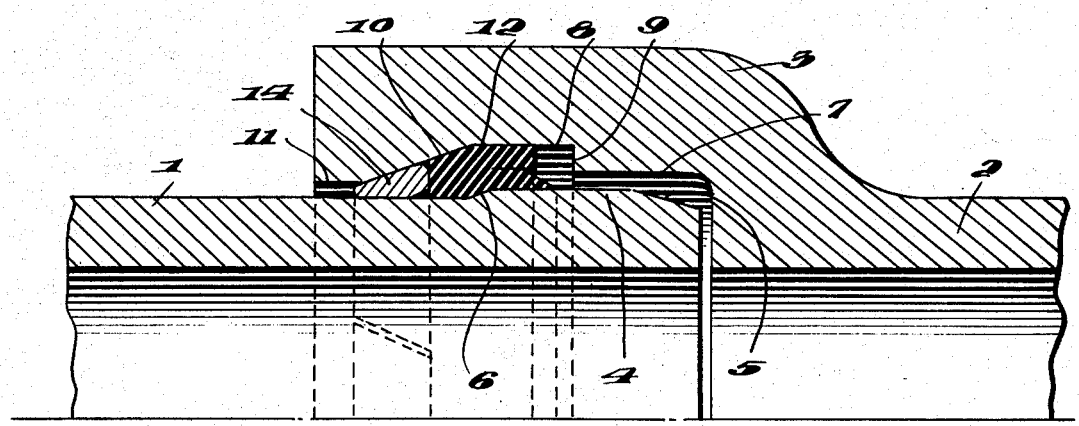
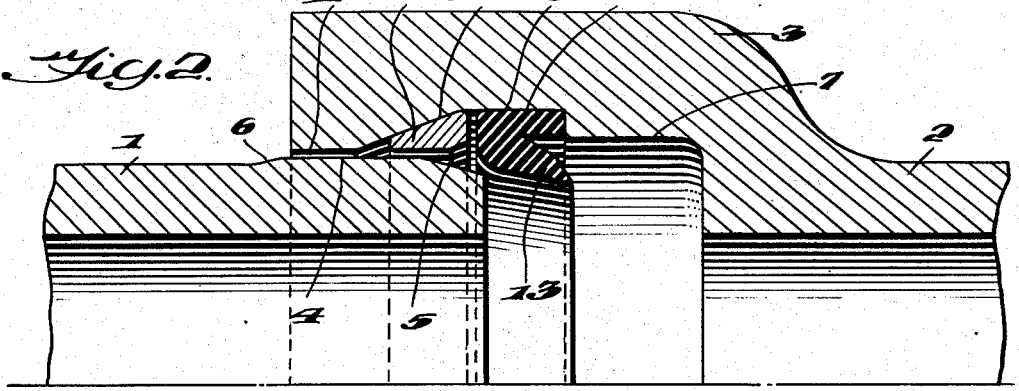
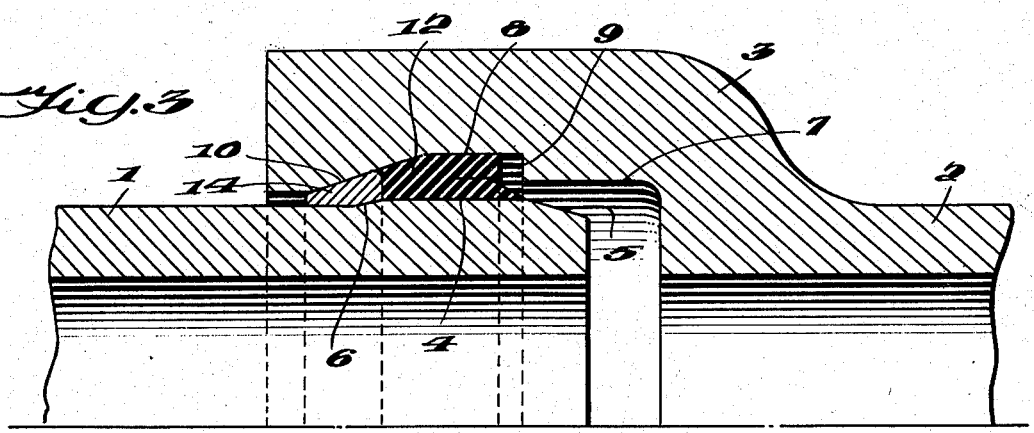

Patented Apr. 16, 1946

2,398,399

UNITED STATES PATENT OFFICE 2,398,399

PIPE JOINT

Millard E. Alexander, West Orange, N. J.

Application February 3, 1943, Serial No. 474,579

2 Claims. (Cl. 285—163)

This invention relates to an improvement in expansion pipe joints of the character used for connecting together sections of pipes, while permitting a limited or controlled expansion action and relative yielding movement when the joint is used particularly for high pressure pipes.

The object of the invention is to improve the construction of pipe joints of this character, to render them more economical to manufacture, requiring the least amount of critical materials due to their simplicity of construction, and to facilitate the assembly of pipe sections including the joint without requiring skilled labor for this purpose. When the joint is assembled, it holds the pipe sections effectively and securely in place while permitting a limited amount of expansion action or relative movement of the sections, particularly when used in high pressure pipes, as well as to allow the pipe to accommodate itself to settlement and variations in the terrene where the pipe may be used.

My invention may be embodied in a joint in which a bell section receives a spigot end of a pipe while these parts are so constructed that a gasket is interposed therebetween and is confined by a lock ring which cooperates with the pipe and bell section to permit the spigot end to be inserted readily therein and yet to seal effectively the space between these parts against the leakage of fluid from the adjacent portions of the pipe. The gasket is constructed preferably of a yieldable material which will be confined nevertheless by the lock ring while it acts on the latter somewhat in a wedging action to hold the gasket effectively in place.

A preferred embodiment of the invention, together with modifications thereof, are shown in the accompanying drawings, in which:

Fig. 1 is a longitudinal sectional view through a pipe joint embodying this invention, with the parts assembled for use;

Fig. 2 is a similar view showing the initial positions of the parts during assembly;

Fig. 3 is a similar view showing an expanded position thereof; and

Figs. 4 and 5 are longitudinal sectional views through modified forms of pipe joints embodying this invention.

The invention is shown in Figs. 1, 2 and 3 as applied to a pipe of the bell and spigot type, although it will be evident that the bell section may be constructed as part of a coupling rather than formed directly on a pipe section, if desired. The pipe sections are designated generally by the numerals 1 and 2, while the bell section 3 is shown as formed on the pipe section 2 and receives therein the spigot end of the pipe section 1.

For this purpose, the pipe section 1 has a circumferential bead 4 on the spigot end portion thereof, which bead has a pilot slope 5 formed as a taper on the forward edge thereof and a shoulder 6 at the rearward edge thereof.

The bell section 3 is formed with a socket 7 therein generally of cylindrical shape, but having an inner recess 8 formed as an enlargement of the socket. The recess 8 has an abrupt shoulder 9 at one side thereof, and a compression slope 10 at the opposite side thereof formed as a long taper. At the open end of the bell section 3, the socket 7 has an entrance portion 11 of cylindrical form, sufficiently large in diameter to receive freely therein the beaded portion of the spigot end of the pipe section 1, as shown in Fig. 2.

Fitted in the recess 8 is a gasket 12 preferably formed of real or synthetic rubber or other suitable material having sufficient elasticity for the purpose. The gasket 12 is shown as initially formed substantially of V-shape, with an inner lip 13 (see Fig. 2), although a solid section, either oval or round in cross section, will serve satisfactorily for the purpose.

Also mounted in the recess 8 beside the gasket 12 is a lock ring 14, which should be of the expansion type and transversely split. The ring 14 is shown as substantially wedge-shaped in cross section with the tapered edge thereof turned toward the entering portion 11 of the socket. A wire ring may be substituted for the wedge-shaped ring, as shown in Fig. 4, if desired, to confine the gasket in place.

The joint may be assembled in a very simple manner without requiring special skilled labor, as will be evident. The gasket 12 should be inserted in the socket recess 8, and the lock ring 14 should then be inserted through the open end of the socket to its position substantially as shown in Fig. 2, where it is interposed between the gasket 12 and the compression slope 10. Then the spigot end of the pipe section 1 should be forced into and through the lock ring 14 and gasket 12, in the manner illustrated in Figs. 2 and 3 until the spigot end abuts against the end wall of the socket 7, substantially as shown in Fig. 1.

During this movement of the spigot end, the gasket 12 will be compressed in the recess 8, and its abutment against the shoulder 9 thereof will cause the gasket to expand axially against the inner edge of the lock ring 14. Since the latter is free to move, it will be forced outwardly relative to the compression slope 10. This action will force the lock ring 14 along the compression slope 10 until the inside surface of the ring contacts with the periphery of the pipe section 1, and until the spigot end has been forced to its innermost position as shown in Fig. 1. At this point, the inside diameter of the lock ring is less than the outside diameter of the bead 4, while the outside diameter of the lock ring is greater than the diameter of the entrance portion 11 of the socket. The joint is thus locked by the ring against separation due to longitudinal pull thereon, because the greater the pull that is applied to the pipe sections, the tighter the lock ring will engage these parts and thereby seal the joint more effectively. The lock ring serves also to close and seal the entrance opening of the socket thereby preventing the gasket material from being forced out of this opening, as well as preventing the entrance of air or other fluids which might cause deterioration of the gasket material.

When the gasket is in place in the recess 8, during the assembly of the joint, it is prevented from being pushed ahead of the spigot end of the pipe section 1 by the recess shoulder 9, and will be pressed outwardly against the periphery of the recess by the pilot slope 5 on the bead 4. When the gasket is in place, it is confined between the surfaces 10, 8, 9, 4 and 6, and the adjacent edge of the lock ring 14, which latter prevents it from being blown out. The seal of the gasket will increase as the pressure in the pipe increases, since this pressure would act to press the gasket more firmly against the lock ring and would cause an expansion of the latter due to its held relation, pressing against the opposing surfaces of the joint. Since the gasket is substantially in open communication with the contents of the pipe, it should be constructed of such material, so as not only to have some elasticity but also to be impermeable to attack by the fluids or gases in the pipe.

The outside surface of the pipe 1 is free to slide along the inside surface of the lock ring, thereby permitting the joint to expand and contract, as may be desired, as a result of internal pressures, settling of the pipe, or variations in the terrene in which it may be placed. The amount of expansion is limited by the distance between the lock ring 14 and the shoulder 6 on the bead 4 when the joint is fully closed, as shown in Fig. 1. The expansion is stopped when the shoulder of the bead is in contact with the lock ring while the latter is also in contact with the compression slope 10 and the outside surface of the pipe section 1, as shown in Fig. 3, thus providing for limited or controlled expansive action.

The clearance shown between the inside surface of the socket 7 and the peripheral surface of the bead 4 permits the joint to have some flexibility and to permit slight changes in grade or alignment caused by settlement or other causes. When this is taking place, the outside or sloping surface of the lock ring 14 acts as a ball and the compression slope 10 acts as the socket of a ball and socket joint, thereby permitting the pipe section 1 to swivel in the bell section 3. The amount of deflection in this joint is controlled by the distance between the lock ring 14 and the shoulder of the bead 4, as shown in Fig. 1. When the end of the spigot is in contact with the end wall of the socket 7 on one side of the pipe and the shoulder of the bead 4 is in contact with the lock ring 14 at the other side of the pipe, the joint would have the full amount of deflection, which is controlled or limited in the same manner as the expansion.

The lock ring 14 is so constructed that it would be free to move in the recess 8, even though the outside surface of the pipe section 1 is in contact with the entrance surface 11 of the socket 7.

This ring 14 serves additional purposes: (1) It acts as a centering device for positioning one pipe within the other. (2) The split ring 14 acts as a medium for transmitting the weight of one pipe directly to the other pipe without transmitting any of this load through the gasket material. This leaves the gasket material free to serve solely as a sealing agent. (3) This ring will also take up a considerable variation in clearances between the two pipes. This is a prime consideration with a pipe manufacturer as it means that close tolerances do not have to be held in its manufacture.

The pipe sections illustrated in Figs. 1 to 3 are shown as of conventional material and character, although it will be evident that these may be formed of cast iron, asbestos cement, or other suitable material desired for use in this manner. The invention may be applied also to other materials, such as steel pipe, concrete pipe, or the like, as shown in Figs. 4 and 5.

In Fig. 4, the pipe sections are designated 31 and 32, the latter having a bell section 33 secured thereon by welding. The bead 34 is formed directly in the steel of the pipe section 31, as will be evident, and is surrounded by the gasket 35 confined by a lock ring 36 which functions substantially as described above. The lock ring 36 is shown as of circular cross section formed of wire or the like, but being confined by the adjacent surface substantially in a wedging action, it will hold the gasket securely in place.

In Fig. 5, the invention is shown as applied to a reinforced concrete pipe having metal joint rings, substantially of conventional construction, and having a spigot joint ring 41 in one concrete section, and a coacting bell section 43 in the other, these rings being embedded in concrete sections, suitably reenforced in the usual way as illustrated. The gasket 45 is confined between the spigot joint ring 41 and the bell section 43 where it is held by the lock ring 46. The action here will be substantially that described above in connection with Figs. 1 to 3.

It will be obvious that the invention may be applied also to reinforced concrete pipe, such as prestressed reinforced concrete pipe, that does not require the joint rings, by acting directly between the concrete sections, substantially as set forth in Figs. 1 to 3.

It is evident also that the joint is applicable to pipes of other materials than those specifically mentioned above, such as plastic materials, in which it would function in a similar manner.

I claim:

1. In a pipe joint, the combination of pipe sections having telescopically arranged bell and spigot portions at adjacent ends thereof, the spigot portion having a surrounding integral bead thereon with a pilot slope at the side of the bead toward the enclosed end of the bell portion and an abrupt shoulder at the opposite side of the bead therefrom, a resilient gasket housed within the bell portion and bearing laterally against the shoulder of the bead, said bell portion having an interior compression slope therein diverging away from the spigot portion, and a lock ring housed within the bell portion and interposed between the gasket and the compression slope, said lock ring being substantially wedge-shaped in cross section and pressed in wedging relation between the bell and spigot portions, confining the gasket therebetween in sealing relation.

2. In a pipe joint, the combination of bell and spigot portions, the spigot portion having a surrounding integral bead thereon with an abrupt shoulder at one side of the bead opposite from the end thereof toward the bell, a resilient gasket housed within the bell portion and bearing laterally against the shoulder of the bead, said bell portion having an interior compression slope therein diverging away from the spigot portion, and a lock ring housed within the bell portion and interposed between the gasket and the compression slope, said lock ring being pressed in wedging relation between the bell and spigot portions confining the gasket therebetween in sealing relation.

MILLARD E. ALEXANDER.